US011133702B2

(12) United States Patent
Izawa et al.

(10) Patent No.: US 11,133,702 B2
(45) Date of Patent: Sep. 28, 2021

(54) VEHICLE POWER SUPPLY SYSTEM

(71) Applicant: Yazaki Corporation, Tokyo (JP)

(72) Inventors: Takaaki Izawa, Shizuoka (JP); Masataka Komiyama, Shizuoka (JP); Yuta Ishikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/938,890

(22) Filed: Jul. 24, 2020

(65) Prior Publication Data
US 2021/0066956 A1 Mar. 4, 2021

(30) Foreign Application Priority Data

Aug. 27, 2019 (JP) .............................. JP2019-154370

(51) Int. Cl.
H02J 9/06 (2006.01)
H02J 7/00 (2006.01)
B60R 16/033 (2006.01)

(52) U.S. Cl.
CPC ............ *H02J 9/061* (2013.01); *B60R 16/033* (2013.01); *H02J 7/005* (2020.01); *H02J 7/0063* (2013.01)

(58) Field of Classification Search
CPC .......... H02J 9/061; H02J 7/005; H02J 7/0063; B60R 16/033

USPC ......................................................... 307/10.1
See application file for complete search history.

(56) References Cited

U.S. PATENT DOCUMENTS

| 2018/0334118 | A1 | 11/2018 | Masui et al. | |
| 2018/0354436 | A1 | 12/2018 | Sato | |
| 2020/0262308 | A1* | 8/2020 | Sasahara | H02J 9/061 |
| 2020/0313457 | A1* | 10/2020 | Kozuki | H02J 7/0068 |

FOREIGN PATENT DOCUMENTS

JP 2016-7993 A 1/2016

* cited by examiner

Primary Examiner — Michael R. Fin
(74) Attorney, Agent, or Firm — Kenealy Vaidya LLP

(57) ABSTRACT

In a vehicle power supply system, when a main power supply device is normal, a backup controller turns on a switch circuit and turns off a switch circuit to supply power from the main power supply device to a load unit LD1 and a load unit, and can travel a vehicle in a normal mode which is in a normal driving state. On the other hand, when the main power supply device is abnormal, the backup controller supplies power from the backup battery to the load unit and does not supply power from the backup battery to the load unit by turning on the switch circuit and turning off the switch circuit, and can travel the vehicle in the limit mode in which the functions are more limited than in the normal mode.

2 Claims, 5 Drawing Sheets

|  | IN NORMAL TIME | | | IN ABNORMAL TIME | |
|---|---|---|---|---|---|
|  | CHARGING (FIG. 2) | NO CHARGING | CHARGING (FIG. 4) | ABNORMALITY OF MAIN POWER SUPPLY DEVICE (FIG. 3) | ABNORMALITY OF BACKUP POWER SUPPLY DEVICE |
| SWITCH CIRCUIT SW1 | ON | ON | ON | OFF | OFF |
| SWITCH CIRCUIT SW2 | OFF | OFF | OFF | ON | OFF |
| SWITCH CIRCUIT SW3 | OFF | OFF | ON | OFF | OFF | though the main battery is abnormal.

VEHICLE POWER SUPPLY SYSTEM

CROSS-REFERENCE TO RELATED APPLICATION(S)

The present application claims priority to and incorporates by reference the entire contents of Japanese Patent Application No. 2019-154370 filed in Japan on Aug. 27, 2019.

BACKGROUND OF THE INVENTION

1. Field of the Invention

The present invention relates to a vehicle power supply system.

2. Description of the Related Art

Conventionally, as a vehicle power supply system, for example, Japanese Patent Application Laid-open No. 2016-7993 discloses a vehicle power supply system including a main battery that supplies power to a first load unit, a sub-battery that supplies power to a second load unit, and a relay unit that switches between the main battery and the sub-battery.

However, the vehicle power supply system disclosed in Japanese Patent Application Laid-open No. 2016-7993 described above is desired to enable a vehicle to travel to a place where safety can be ensured without stopping the vehicle at the place even when the main battery is abnormal.

SUMMARY OF THE INVENTION

Therefore, the present invention has been made in view of the above, and an object of the present invention is to provide a vehicle power supply system that enables a vehicle to travel to a place where safety can be ensured even when a main power supply device is abnormal.

In order to solve the above mentioned problem and achieve the object, a vehicle power supply system according to one aspect of the present invention includes a main power supply device that is mounted on a vehicle and supplies power to a first load unit and a second load unit; and a backup power supply device that is mounted on the vehicle and supplies power to the second load unit when the main power supply device is abnormal, wherein the backup power supply device includes a first switch circuit that switches a connection with the main power supply device, a backup battery that stores power supplied from the main power supply device and supplies power to the second load unit, a second switch circuit that switches a connection between the backup battery and the second load unit, and a controller that controls the first switch circuit and the second switch circuit, when the main power supply device is normal, the controller turns on the first switch circuit and turns off the second switch circuit to supply power from the main power supply device to the first load unit and the second load unit and enable to travel the vehicle in a normal mode which is a normal driving state, and when the main power supply device is abnormal, the controller turns on the second switch circuit and turns off the first switch circuit to supply power from the backup battery to the second load unit, not to supply power from the backup battery to the first load unit and enable to travel the vehicle in a limit mode in which a function is more limited than in the normal mode.

According to another aspect of the present invention, in the vehicle power supply system, it is preferable that the backup power supply device includes a discharge circuit that discharges the power of the backup battery, and a third switch circuit that switches a connection between the backup battery and the discharge circuit, and the controller turns on the third switch circuit and turns off the second switch circuit to cause the discharge circuit to discharge the power of the backup battery and estimate a deterioration state of the backup battery.

According to still another aspect of the present invention, in the vehicle power supply system, it is preferable that the first load unit and the second load unit include respective devices that are combined with each other to configure one actuator, the actuator performs a normal operation by operating the device of the first load unit and the device of the second load unit, and the device of the first load unit does not operate and the device of the second load unit operates to perform a limiting operation in which a function is more limited than in the normal operation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An aspect (embodiment) for carrying out the present invention will be described in detail with reference to the drawings. The present invention is not limited by the contents described in the following embodiment. Further, components described below include those that can be easily assumed by those skilled in the art and those that are substantially the same. Further, configurations described below can be appropriately combined. Further, various omissions, substitutions, or changes in the configuration can be made without departing from the spirit of the present invention.

Embodiment

Figure 1:
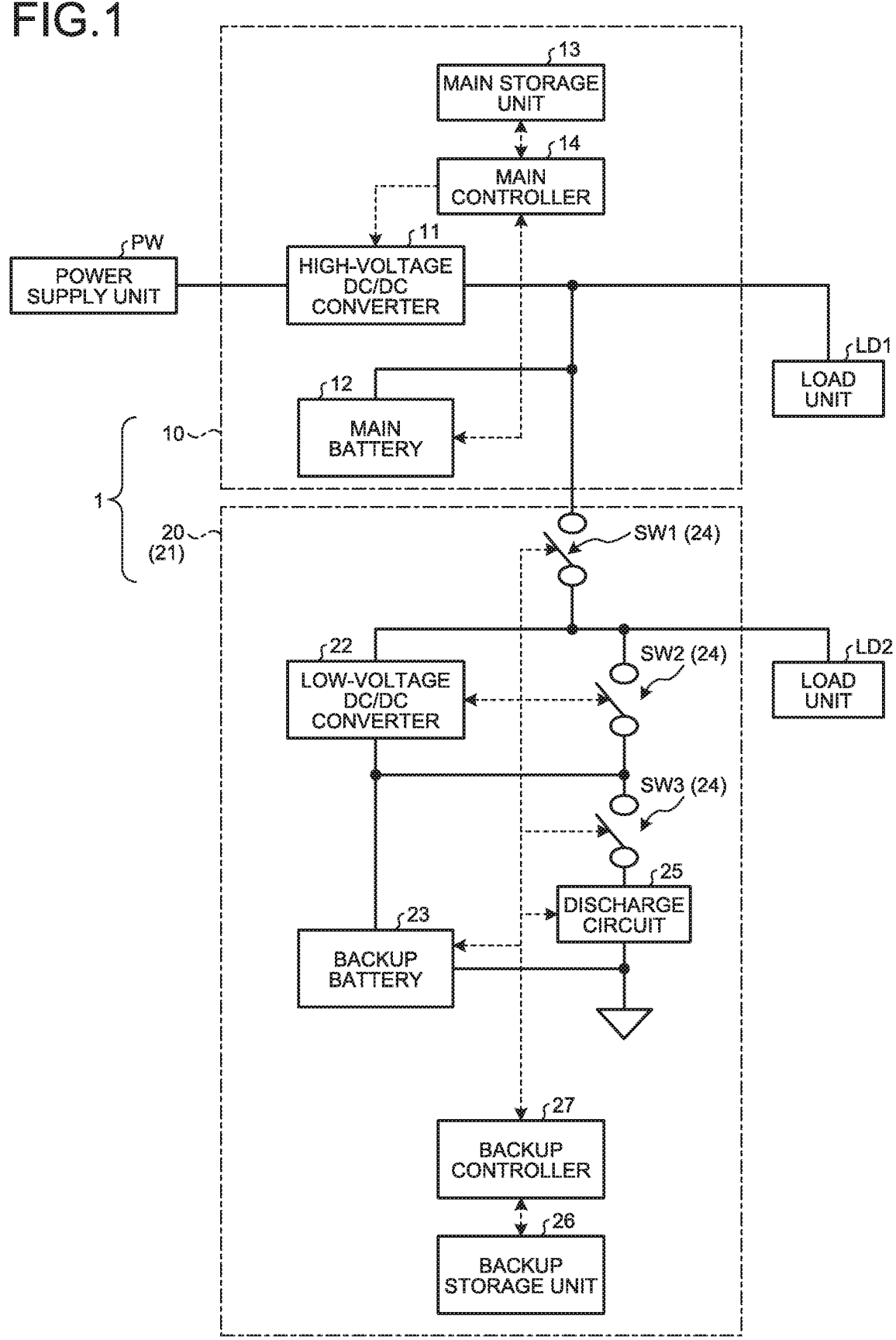
FIG. 1 is a block diagram illustrating a configuration example of a vehicle power supply system according to an embodiment.
Figure 2:
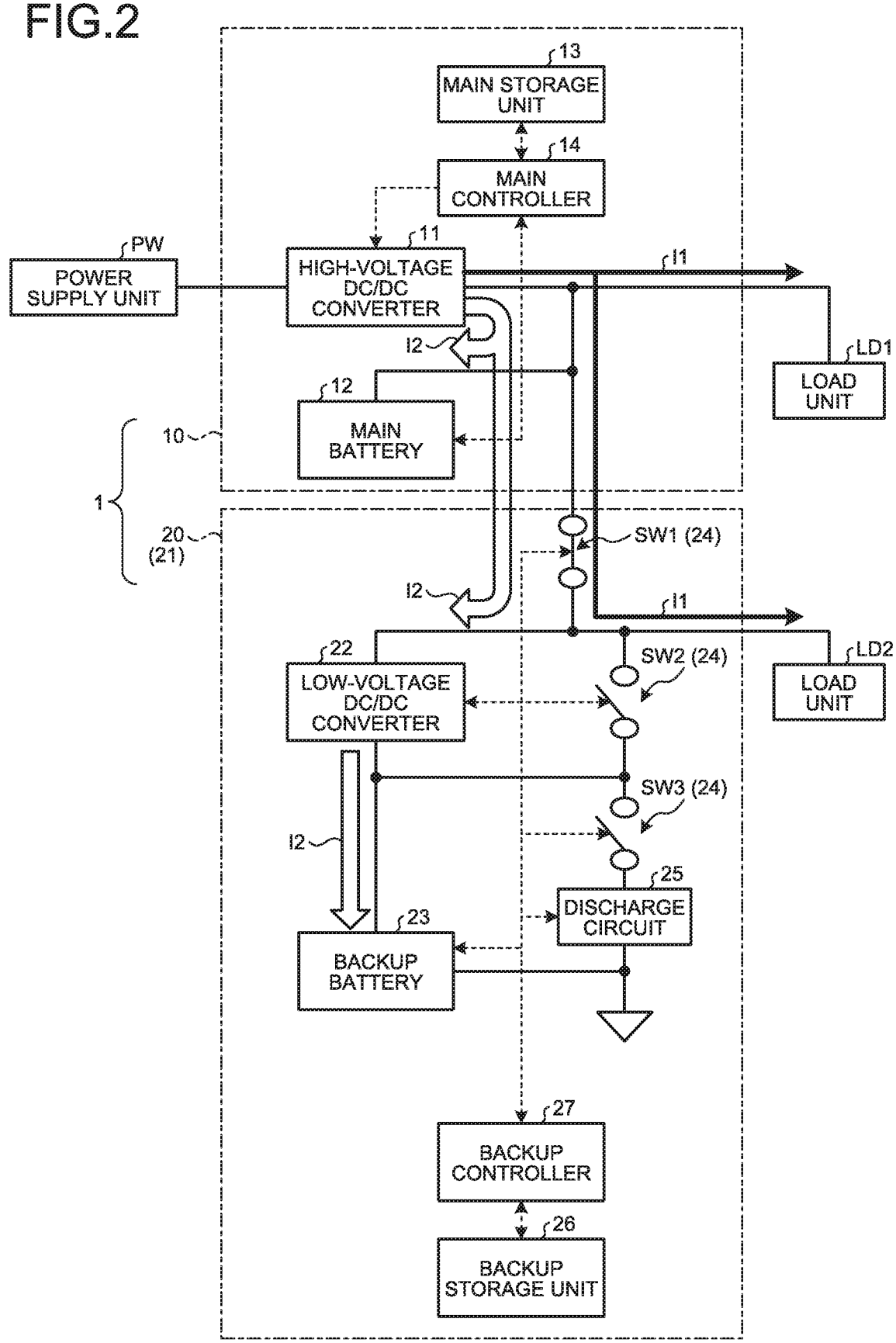
FIG. 2 is a block diagram illustrating an operation example of the main power supply device in a normal state according to an embodiment.
Figure 3:
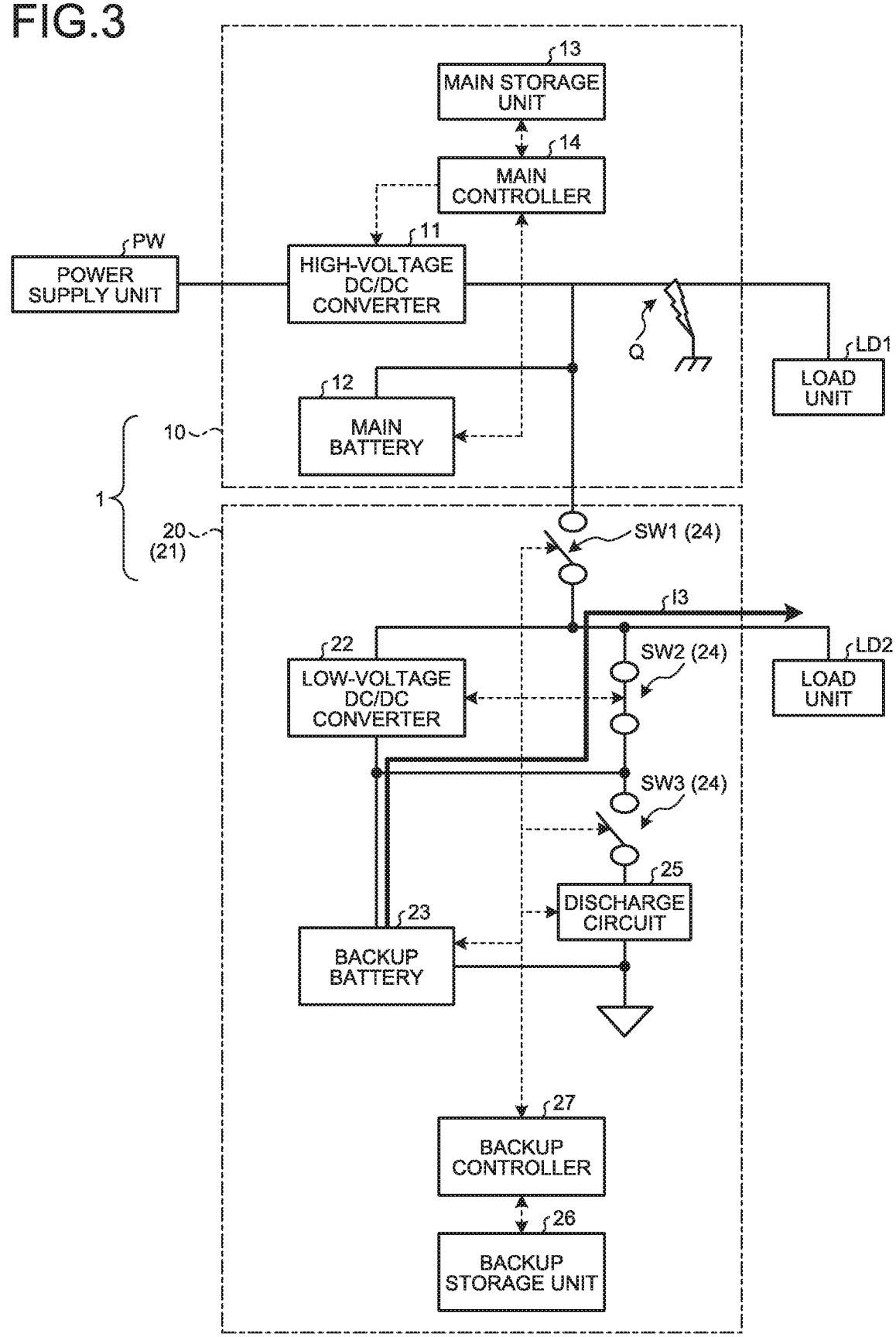
FIG. 3 is a block diagram illustrating an operation example of the main power supply device in an abnormal state according to an embodiment.
Figure 4:
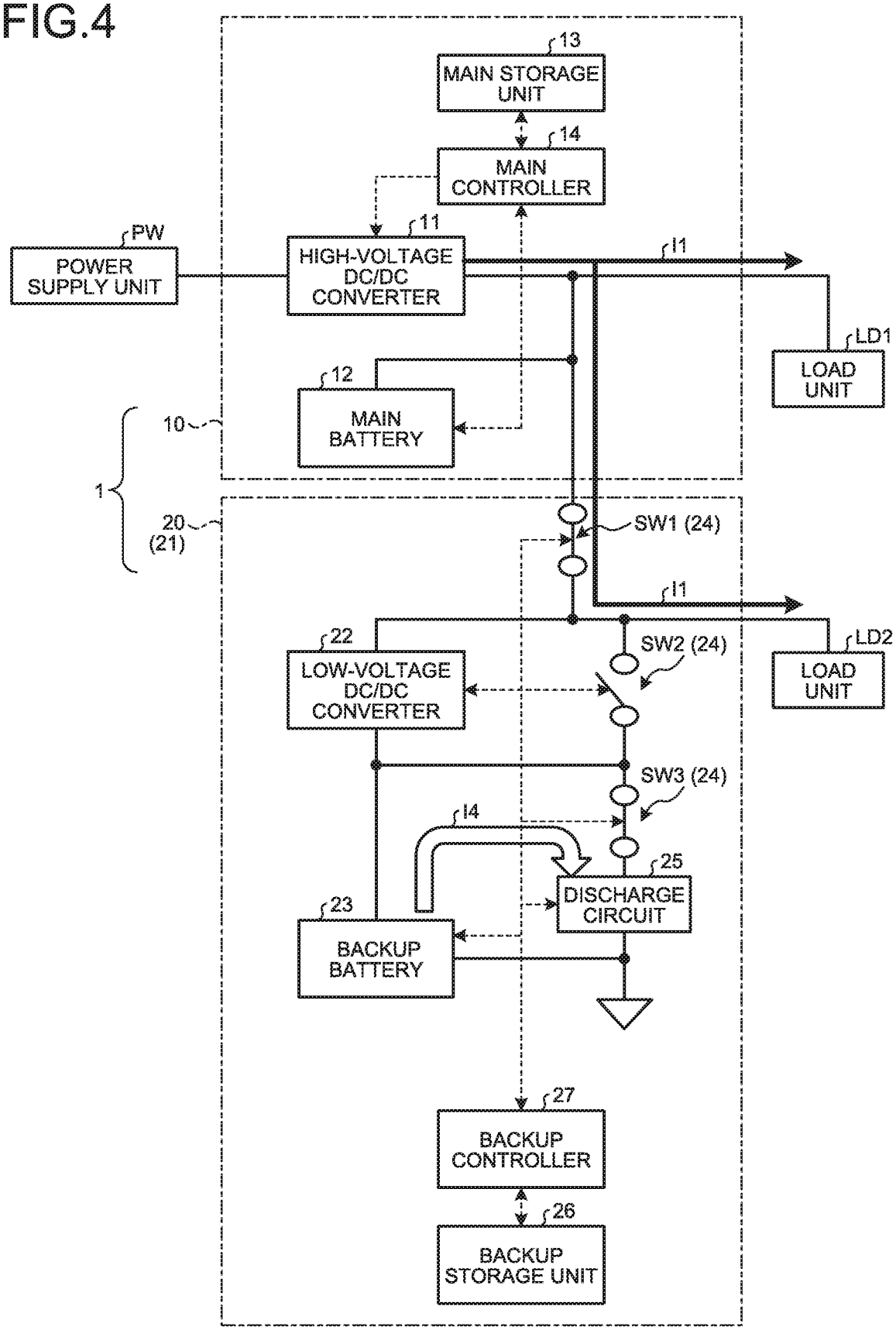
FIG. 4 is a block diagram illustrating a discharge control of a backup battery according to an embodiment.
Figures 5, 6:
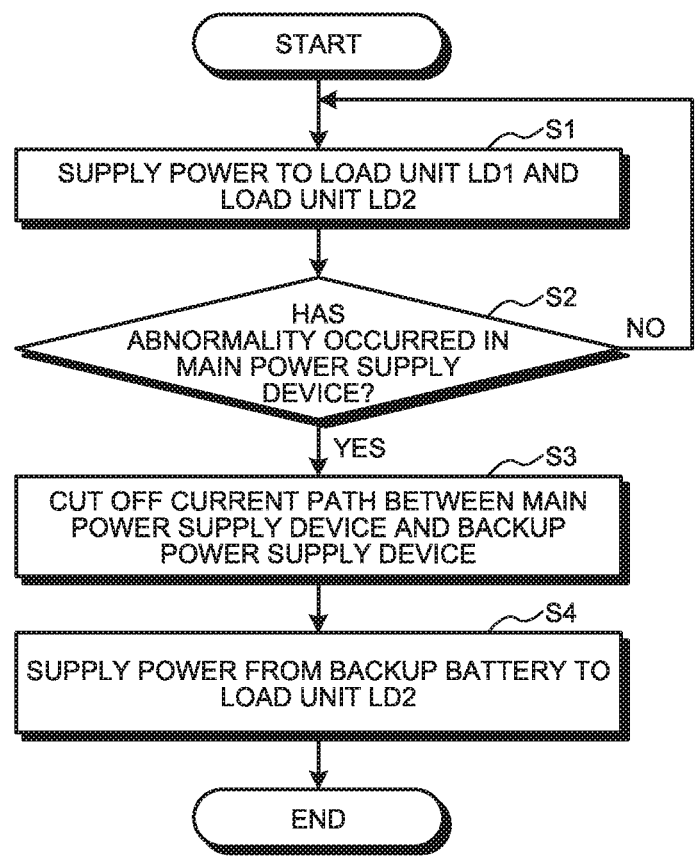
FIG. 5 is a diagram illustrating a turn on/off of a switch circuit according to an embodiment.
FIG. 6 is a flowchart illustrating an operation example of the vehicle power supply system according to an embodiment.

A vehicle power supply system 1 according to an embodiment will be described with reference to the drawings. FIG. 1 is a block diagram illustrating a configuration example of a vehicle power supply system 1 according to an embodiment. FIG. 2 is a block diagram illustrating an operation example of a main power supply device 10 in a normal state according to an embodiment. FIG. 3 is a block diagram illustrating an operation example of the main power supply device 10 in an abnormal state according to an embodiment. FIG. 4 is a block diagram illustrating a discharge control of a backup battery 23 according to an embodiment. FIG. 5 is a diagram illustrating a turn on/off of switch circuits SW1 to SW3 according to an embodiment.

The vehicle power supply system 1 is mounted on a vehicle and supplies DC power (simply referred to as "power") to a load unit LD1 as a first load unit and a load unit LD2 as a second load unit. Here, the load unit LD1 and the load unit LD2 are configured to include respective devices that are combined with each other to configure one actuator. The load unit LD1 is configured to include, for example, general devices such as an air conditioner and an audio device, and important devices such as a first steering device, a first brake device, and a first sensor. The load unit LD2 is configured to include, for example, important devices such as a second steering device, a second brake device, and a second sensor. The load unit LD1 and the load unit LD2 are combined with each other to configure one actuator. The load unit LD1 and the load unit LD2 configure, for example, one actuator (steering device) by combining the first steering device and the second steering device. The actuator operates normally by operating the device of the load unit LD1 and the device of the load unit LD2. For example, the steering device as the actuator performs a normal operation of the steering device by operating the first steering device and the second steering device. On the other hand, the actuator performs a limiting operation in which functions are more limited than in the normal operation by operating the device of the load unit LD2 without operating the device of the load unit LD1. For example, the steering device as the actuator performs the limiting operation of the steering device by operating the second steering device without operating the first steering device.

As illustrated in FIG. 1, the vehicle power supply system 1 includes a main power supply device 10 and a backup power supply device 20. The main power supply device 10 supplies power to the load unit LD1 and the load unit LD2. The main power supply device 10 includes a high-voltage DC/DC converter 11, a main battery 12, a main storage unit 13, and a main controller 14. The high-voltage DC/DC converter 11 transforms a DC voltage. The high-voltage DC/DC converter 11 is connected to, for example, a power supply unit PW that supplies power from the outside, and bucks a voltage of DC power output from the power supply unit PW. The high-voltage DC/DC converter 11 bucks the voltage to, for example, 12 V. The high-voltage DC/DC converter 11 is connected to the main battery 12 and outputs the bucked DC power to the main battery 12. The high-voltage DC/DC converter 11 is connected to the load unit LD1 and to the load unit LD2 via the backup power supply device 20. The high-voltage DC/DC converter 11 supplies power to the load unit LD1 and to the load unit LD2 via the backup power supply device 20.

The main battery 12 stores power, and is, for example, a lead storage battery. The main battery 12 is connected to the high-voltage DC/DC converter 11, and stores the DC power bucked by the high-voltage DC/DC converter 11. The main battery 12 is connected to the load unit LD1 and to the load unit LD2 via the backup power supply device 20. The main battery 12 supplies power to the load unit LD1 and to the load unit LD2 via the backup power supply device 20.

The main storage unit 13 is a memory that stores information. The main storage unit 13 stores a first control program for operating the main controller 14, and the like.

The main controller 14 controls the high-voltage DC/DC converter 11. The main controller 14 is configured to include an electronic circuit mainly including a known microcomputer including a CPU and an interface. The main controller 14 is connected to the main storage unit 13 and reads a first control program stored in the main storage unit 13. Then, the main controller 14 operates according to the read first control program. The main controller 14 monitors a power storage state of the main battery 12 based on, for example, the first control program, and controls the high-voltage DC/DC converter 11 according to the power storage state of the main battery 12. The main controller 14 charges the main battery 12 by increasing an output voltage of the high-voltage DC/DC converter 11, for example, when a power storage rate of the main battery 12 is less than a predetermined first reference value. On the other hand, when the power storage rate of the main battery 12 is equal to or greater than the first reference value, the main controller 14 lowers the output voltage of the high-voltage DC/DC converter 11 to maintain the power storage rate of the main battery 12.

The backup power supply device 20 supplies power to the load unit LD2 in place of the main power supply device 10 when the main power supply device 10 is abnormal such as a ground fault. The backup power supply device 20 is connected to, for example, the main power supply device 10 and the load unit LD2 via a connector (not illustrated). The backup power supply device 20 includes a housing 21, a low-voltage DC/DC converter 22, a backup battery 23, a switch unit 24, a discharge circuit 25, a backup storage unit 26, and a backup controller 27.

The housing 21 houses various electronic components. The housing 21 is formed in a box shape having a heat dissipation function. The housing 21 is configured separately from the main power supply device 10. The housing 21 includes a low-voltage DC/DC converter 22, a backup battery 23, a switch unit 24, a discharge circuit 25, a backup storage unit 26, and a backup controller 27 housed in an internal space thereof. The housing 21 may have the backup battery 23 attached externally without housing the backup battery 23 in the internal space.

The low-voltage DC/DC converter 22 transforms a DC voltage. The low-voltage DC/DC converter 22 is connected to the high-voltage DC/DC converter 11 via a switch unit 24 (switch circuit SW1). When the backup battery 23 needs to be charged, the low-voltage DC/DC converter 22 receives DC power that is converted from high voltage to low voltage and output by the high-voltage DC/DC converter 11, and boosts the voltage to a terminal voltage of the backup battery 23. The low-voltage DC/DC converter 22 is connected to the backup battery 23 and outputs the boosted DC power to the backup battery 23.

The backup battery 23 stores power, and is, for example, a lithium ion battery. The backup battery 23 is connected to the low-voltage DC/DC converter 22, and stores the DC power boosted by the low-voltage DC/DC converter 22. The backup battery 23 is connected to the load unit LD2 via the switch unit 24 (switch circuit SW2), and supplies the stored DC power to the load unit LD2.

The switch unit 24 is for supplying or cutting off a current. The switch unit 24 is configured to include a switch circuit SW1 as a first switch circuit, a switch circuit SW2 as a second switch circuit, and a switch circuit SW3 as a third switch circuit. The switch circuit SW1 is provided between the main power supply device 10 and the backup power supply device 20, and switches the connection between the main power supply device 10 and the backup power supply device 20.

The switch circuit SW1 is located, for example, between the high-voltage DC/DC converter 11 and the low-voltage DC/DC converter 22, and switches the connection between the high-voltage DC/DC converter 11 and the low-voltage DC/DC converter 22. The switch circuit SW1 is turned on to energize a current path connecting between the high-voltage DC/DC converter 11 and the low-voltage DC/DC converter 22, and turned off to cut off a current path connecting between the high-voltage DC/DC converter 11 and the low-voltage DC/DC converter 22. In addition, the switch circuit SW1 is located between the high-voltage DC/DC converter 11 and the load unit LD2, and switches the connection between the high-voltage DC/DC converter 11 and the load unit LD2. The switch circuit SW1 is turned on to energize a current path connecting between the high-voltage DC/DC converter 11 and the load unit LD2, and turned off to cut off a current path connecting between the high-voltage DC/DC converter 11 and the load unit LD2. In addition, the switch circuit SW1 is located between the main battery 12 and the load unit LD2, and switches the connection between the main battery 12 and the load unit LD2. The switch circuit SW1 is turned on to energize the current path connecting between the main battery 12 and the load unit LD2, and turned off to cut off a current path connecting between the main battery 12 and the load unit LD2.

For example, when the main power supply device 10 and the backup power supply device 20 are normal, the switch circuit SW1 is turned on based on an ON signal output from the backup controller 27, and energizes a current path connecting between the main power supply device 10 and the backup power supply device 20. On the other hand, when the main power supply device 10 or the backup power supply device 20 is abnormal, the switch circuit SW1 is turned off based on an OFF signal output from the backup controller 27, and cuts off a current path connecting between the main power supply device 10 and the backup power supply device 20.

The switch circuit SW2 is located between the backup battery 23 and the load unit LD2, and switches the connection between the backup battery 23 and the load unit LD2. The switch circuit SW2 is turned on to energize a current path connecting between the backup battery 23 and the load unit LD2, and turned off to cut off the current path connecting between the backup battery 23 and the load unit LD2.

For example, when the main power supply device 10 and the backup power supply device 20 are normal, the switch circuit SW2 is turned off based on an OFF signal output from the backup controller 27, and cuts off a current path connecting between the backup battery 23 and the load unit LD2. On the other hand, when the main power supply device 10 is abnormal, the switch circuit SW2 is turned on based on the ON signal output from the backup controller 27, and energizes the current path connecting between the backup battery 23 and the load unit LD2.

The switch circuit SW3 is provided between the backup battery 23 and the discharge circuit 25, and switches a connection between the backup battery 23 and the discharge circuit 25. The switch circuit SW3 is turned on to energize a current path connecting between the backup battery 23 and the discharge circuit 25, and turned off to cut off a current path connecting between the backup battery 23 and the discharge circuit 25.

For example, when a deterioration state of the backup battery 23 is estimated, the switch circuit SW3 is turned on based on the ON signal output from the backup controller 27, and energizes the current path connecting between the backup battery 23 and the discharge circuit 25. On the other hand, when the deterioration state of the backup battery 23 is not estimated, the switch circuit SW3 is turned off based on the OFF signal output from the backup controller 27, and cuts off the current path connecting between the backup battery 23 and the discharge circuit 25.

The discharge circuit 25 discharges the power of the backup battery 23. The discharge circuit 25 is connected to the backup battery 23 via the switch circuit SW3. The discharge circuit 25 is configured to include a resistor, a current sensor, and a voltage sensor (not illustrated). The resistor functions as a resistance to a current flowing from the backup battery 23 when the switch circuit SW3 is in a turn on state. The current sensor detects a current flowing from the backup battery 23 when the switch circuit SW3 is in the turn on state. The current sensor is connected to the backup controller 27 and outputs the detected current to the backup controller 27. The voltage sensor detects a voltage applied from the backup battery 23 when the switch circuit SW3 is in the turn on state. The voltage sensor is connected to the backup controller 27 and outputs the detected voltage to the backup controller 27.

The backup storage unit 26 is a memory that stores information. The backup storage unit 26 is a storage unit different from the main storage unit 13 described above, and stores a second control program for operating the backup controller 27. The second control program is a program different from the first control program described above. That is, the second control program is described in a different source code from the first control program.

The backup controller 27 controls the low-voltage DC/DC converter 22 and the switch unit 24. The backup controller 27 is configured to include an electronic circuit mainly including the known microcomputer including the CPU and the interface. The backup controller 27 is connected to the backup storage unit 26 and reads a second control program stored in the backup storage unit 26. Then, the backup controller 27 operates according to the read second control program. As a result, since the backup controller 27 operates the second control program different from the main controller 14, the vehicle power supply system 1 can add the backup power supply device 20 to a vehicle without changing specifications of the first control program of the main power supply device 10. In addition, the vehicle power supply system 1 can equalize the specifications of the first control program of the main power supply device 10 in a vehicle mounted with the backup power supply device 20 and a vehicle not mounted with the backup power supply device 20.

As a result, the vehicle power supply system 1 can easily add the backup power supply device 20, and can improve the mountability of the backup power supply device 20. It is determined that the backup power supply device 20 is mounted on a vehicle, for example, depending on a level of automatic driving, but the backup power supply device 20 is often not mounted on a vehicle at present, and the present invention has a great advantage that the backup power supply device 20 is easily mounted on a vehicle.

The backup controller 27 monitors a power storage state of the backup battery 23 based on, for example, the second control program, and controls the low-voltage DC/DC converter 22 according to the power storage state of the backup battery 23. The backup controller 27 charges the backup battery 23 by increasing an output voltage of the low-voltage DC/DC converter 22, for example, when a power storage rate of the backup battery 23 is less than a predetermined second reference value. On the other hand, when the power storage rate of the backup battery 23 is equal to or greater than the second reference value, the backup controller 27 lowers the output voltage of the low-voltage DC/DC converter 22 to maintain the power storage rate of the backup battery 23.

Further, for example, when the main power supply device 10 and the backup power supply device 20 are normal, the backup controller 27 causes the vehicle to run in a normal mode. Here, the normal mode is a normal driving state, for example, a state in which both the main battery 12 and the backup battery 23 are normal, and is a mode in which the load units LD1 and LD2 operate. When the main power supply device 10 and the backup power supply device 20 are normal, the backup controller 27 outputs the ON signal to the switch circuit SW1, and energizes the current path connecting between the main power supply device 10 and the backup power supply device 20. In addition, when the main power supply device 10 and the backup power supply device 20 are normal, the backup controller 27 outputs the OFF signal to the switch circuit SW2, and cuts off the current path connecting between the backup battery 23 and the load unit LD2. As a result, as illustrated in FIG. 2, the backup controller 27 can make a load current I1 flow from the high-voltage DC/DC converter 11 to the load units LD1 and LD2. Further, the backup controller 27 can make a charge current I2 flow from the high-voltage DC/DC converter 11 to the main battery 12 and the backup battery 23. FIG. 5 illustrates the turn on/off of the switch circuits SW1 to SW3 when the vehicle power supply system 1 is normal or abnormal.

On the other hand, as illustrated in FIG. 3, when the main power supply device 10 is abnormal due to ground fault Q or the like, the backup controller 27 causes the vehicle to travel in a limit mode. Here, the limit mode is a driving state when abnormality occurs. For example, the limit mode is a mode in which the main power supply device 10 is in an abnormal state, and the load unit LD2 operates and the load unit LD1 does not operate. As described above, the limit mode is a mode in which the function that governs the traveling of the vehicle is more limited than in the normal mode. The vehicle can travel by itself even in the limit mode. For example, the vehicle can travel in the limit mode to a place where the safety of the vehicle is ensured.

When the main power supply device 10 is abnormal, the backup controller 27 outputs the OFF signal to the switch circuit SW1, and cuts off the current path connecting between the main power supply device 10 and the backup power supply device 20. In addition, when the main power supply device 10 is abnormal, the backup controller 27 outputs the ON signal to the switch circuit SW2, and energizes the current path connecting between the backup battery 23 and the load unit LD2. Thereby, as illustrated in FIG. 3, the backup controller 27 can make a load current I3 flow from the backup battery 23 to the load unit LD2 in the state in which the main power supply device 10 is disconnected from the backup power supply device 20. At this time, the backup controller 27 does not supply power from the backup battery 23 to the load unit LD1. For example, in the actuator configured by combining the load unit LD1 and the load unit LD2, the backup controller 27 supplies power to the load unit LD2 and does not supply power to the load unit LD1 when the main power supply device 10 is abnormal, such that the vehicle can travel in the limit mode in which the function of the actuator is limited.

In addition, when the backup power supply device 20 is abnormal due to the ground fault and the like, the backup controller 27 outputs the OFF signal to the switch circuit SW1, and cuts off the current path connecting between the main power supply device 10 and the backup power supply device 20. Thereby, the main controller 14 can make the load current I1 flow from the main battery 12 to the load unit LD1 in the state in which the backup power supply device 20 is disconnected from the main power supply device 10. Thereby, when the backup power supply device 20 is abnormal, the vehicle power supply system 1 can cause the main power supply device 10 alone to travel the vehicle. Therefore, the vehicle power supply system 1 can appropriately supply power that can travel the vehicle to a place where the safety of the vehicle can be ensured even when the backup power supply device 20 is abnormal.

Further, the backup controller 27 discharges the power of the backup battery 23 by the discharge circuit 25, and estimates the deterioration state of the backup battery 23. The backup controller 27 estimates the deterioration state of the backup battery 23, for example, at the timing when an accessory (ACC) power supply or an ignition (IG) power supply of the vehicle is turned on. When the deterioration state of the backup battery 23 is estimated, the backup controller 27 outputs the ON signal to the switch circuit SW3 and outputs the OFF signal to the switch circuit SW2, and energizes the current path connecting between the backup battery 23 and the discharge circuit 25. Thereby, as illustrated in FIG. 4, the backup controller 27 can make a current flow from the backup battery 23 to the discharge circuit 25.

The backup controller 27 obtains the internal resistance of the backup battery 23 based on the current output from the current sensor of the discharge circuit 25 and the voltage output from the voltage sensor of the discharge circuit 25. Then, the backup controller 27 estimates the deterioration state of the backup battery 23 based on the obtained internal resistance of the backup battery 23. For example, when the internal resistance of the backup battery 23 is equal to or higher than a predetermined reference resistance, the backup controller 27 estimates that the backup battery 23 has deteriorated. On the other hand, when the internal resistance of the backup battery 23 is less than the reference resistance, the backup controller 27 estimates that the backup battery 23 has not deteriorated. When the deterioration state of the backup battery 23 is not estimated, the backup controller 27 outputs the OFF signal to the switch circuit SW3, and cuts off the current path connecting between the backup battery 23 and the discharge circuit 25.

Next, an operation example of the vehicle power supply system 1 will be described. FIG. 6 is a flowchart illustrating the operation example of the vehicle power supply system 1 according to the embodiment. In the vehicle power supply system 1, the main power supply device 10 supplies power to the load unit LD1 and the load unit LD2 (Step S1). Next, the backup power supply device 20 determines whether or not the abnormality such as the ground fault occurs in the main power supply device 10 (Step S2). When the abnormality such as the ground fault occurs in the main power supply device 10 (Step S2; Yes), the backup power supply device 20 turns off the switch circuit SW1 and cuts off the current path between the backup power supply device 20 and the main power supply device 10 (Step S3). Next, as illustrated in FIG. 3, the backup power supply device 20 turns on the switch circuit SW2, and supplies power from the backup battery 23 to the load unit LD2 (Step S4). At this time, the backup power supply device 20 does not supply power from the backup battery 23 to the load unit LD1. Further, the backup power supply device 20 turns off the switch circuit SW3, and cuts off the current path connecting between the backup battery 23 and the discharge circuit 25.

As described above, the vehicle power supply system 1 according to the embodiment includes the main power supply device 10 and the backup power supply device 20. The main power supply device 10 is mounted on the vehicle and supplies power to the load unit LD1 and the load unit LD2. The backup power supply device 20 is mounted on the vehicle and supplies power to the load unit LD2 when the main power supply device 10 is abnormal. The backup power supply device 20 includes, for example, the switch circuit SW1 that switches the connection with the main power supply device 10, the backup battery 23 that stores power supplied from the main power supply device 10 and supplies power to the load unit LD2, the switch circuit SW2 that switches the connection between the backup battery 23 and the load unit LD2, and the backup controller 27 that controls the switch circuits SW1 and SW2.

When the main power supply device 10 is normal, the backup controller 27 supplies power from the main power supply device 10 to the load unit LD1 and the load unit LD2 by turning on the switch circuit SW1 and turning off the switch circuit SW2, and can travel the vehicle in the normal mode which is the normal driving state. On the other hand, when the main power supply device 10 is abnormal, the backup controller 27 supplies power from the backup battery 23 to the load unit LD2 and does not supply power from the backup battery 23 to the load unit LD1 by turning on the switch circuit SW2 and turning off the switch circuit SW1, and can travel the vehicle in the limit mode in which the functions are more limited than in the normal mode.

With this configuration, when the main power supply device 10 is abnormal, the vehicle power supply system 1 disconnects the main power supply device 10 from the backup power supply device 20 by turning off the switch circuit SW1, and can cause the backup power supply device 20 alone to travel the vehicle. Thereby, the vehicle power supply system 1 can cause the vehicle to travel to a place where the safety can be ensured even when the main power supply device 10 is abnormal.

In the vehicle power supply system 1, the backup power supply device 20 includes the discharge circuit 25 that discharges the power of the backup battery 23, and the switch circuit SW3 that switches the connection between the backup battery 23 and the discharge circuit 25. The backup controller 27 discharges the power of the backup battery 23 by the discharge circuit 25 and estimates the deterioration state of the backup battery 23 by turning on the switch circuit SW3 and turning off the switch circuit SW2. Thereby, the vehicle power supply system 1 can warn the driver of the abnormality of the backup battery 23 based on the estimated deterioration state of the backup battery 23. With this configuration, the vehicle power supply system 1 can more reliably supply power that can travel the vehicle to the place where the safety of the vehicle can be ensured.

In the vehicle power supply system 1, the load unit LD1 and the load unit LD2 include respective devices that are combined with each other to configure one actuator. The actuator operates normally by operating the device of the load unit LD1 and the device of the load unit LD2. In addition, the actuator performs a limiting operation in which the functions are more limited than in the normal operation by operating the device of the load unit LD2 without operating the device of the load unit LD1. With this configuration, the vehicle power supply system 1 can cause the vehicle travel to the place where the safety of the vehicle can be ensured even when the main power supply device 10 is abnormal.

Modified Example

Next, a modified example of the embodiment will be described. Although the example in which the load unit LD1 is configured to include, for example, the general devices such as the air conditioner and the audio, and the important devices such as the first steering device, the first brake device, and the first sensor, and the load unit LD2 is configured to include, for example, the important devices such as the second steering device, the second brake device, and the second sensor has been described, the present invention is not limited thereto, and the load units LD1 and LD2 may be configured to include other electronic devices.

Although the example in which the backup power supply device 20 is applied to an automatically driven vehicle has been described, the present invention is not limited thereto, and may be applied to vehicles other than the automatically driven vehicle.

Although the example in which the vehicle power supply system 1 includes the discharge circuit 25 has been described, the invention is not limited thereto, and the vehicle power supply system 1 may not include the discharge circuit 25.

Although the load unit LD1 and the load unit LD2 have been described as the example in which the load unit LD1 and the load unit LD2 are combined with each other to configure one actuator, the present invention is not limited thereto, and the load unit LD1 and the load unit LD2 may each configure different actuators.

FIG. 4 illustrates an example in which the backup controller 27 may make a current flow from the backup battery 23 to the discharge circuit 25 in the state in which power is supplied to the load unit LD2, but the present invention is not limited thereto, and a current may flow from the backup battery 23 to the discharge circuit 25 in the state in which the power is not supplied to the load unit LD2.

The vehicle power supply system according to the present embodiment can travel the vehicle in the limit mode in which power is supplied from the backup battery to the second load unit and power is not supplied from the backup battery to the first load unit when the main power supply device is abnormal, and as a result, can travel the vehicle to the place where the safety can be ensured even when the main power supply device is abnormal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply system, comprising:
   a main power supply device that is mounted on a vehicle and supplies power to a first load unit and a second load unit; and
   a backup power supply device that is mounted on the vehicle and supplies power to the second load unit when the main power supply device is abnormal, wherein
   the backup power supply device includes a first switch circuit that switches a connection with the main power supply device, a backup battery that stores power supplied from the main power supply device and supplies power to the second load unit, a second switch circuit that switches a connection between the backup battery and the second load unit, and a controller that controls the first switch circuit and the second switch circuit, when the main power supply device is normal, the controller turns on the first switch circuit and turns off the second switch circuit to supply power from the main power supply device to the first load unit and the second load unit such that the vehicle operates in a normal mode, and when the main power supply device is abnormal, the controller turns on the second switch circuit and turns off the first switch circuit to supply power from the backup battery to the second load unit and not to supply power from the backup battery to the first load unit such that the vehicle operates in a limit mode which is different from the normal mode, wherein the backup power supply device includes a discharge circuit that discharges the power of the backup battery, and a third switch circuit that switches a connection between the backup battery and the discharge circuit, and the controller turns on the third switch circuit and turns off the second switch circuit to cause the discharge circuit to discharge the power of the backup battery and estimate a deterioration state of the backup battery.

2. The vehicle power supply system according to claim 1, wherein the first load unit and the second load unit include respective devices that are operated together when the vehicle operates in the normal mode, and the device of the first load unit does not operate and the device of the second load unit operates when the vehicle operates in the limit mode.

* * * * *